US008364456B2

(12) United States Patent
Raghavan et al.

(10) Patent No.: US 8,364,456 B2
(45) Date of Patent: Jan. 29, 2013

(54) CONDITIONALLY EXECUTED STATES

(75) Inventors: Vijaya Raghavan, Framingham, MA (US); Zhihong Zhao, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1047 days.

(21) Appl. No.: 11/972,151

(22) Filed: Jan. 10, 2008

(65) Prior Publication Data
US 2009/0179921 A1  Jul. 16, 2009

(51) Int. Cl.
G06G 7/48 (2006.01)
G06G 7/58 (2006.01)
G06G 7/62 (2006.01)
G06F 17/50 (2006.01)

(52) U.S. Cl. .......... 703/13; 703/6; 703/7; 703/8; 703/9; 703/22

(58) Field of Classification Search ............... 703/11, 703/13, 22
See application file for complete search history.

(56) References Cited

U.S. PATENT DOCUMENTS

| | | | | |
|---|---|---|---|---|
| 5,732,192 A * | 3/1998 | Malin et al. | | 703/2 |
| 6,408,262 B1 * | 6/2002 | Leerberg et al. | | 703/2 |
| 7,369,977 B1 * | 5/2008 | Clune et al. | | 703/6 |
| 7,743,361 B2 * | 6/2010 | Clark | | 717/105 |
| 2002/0052725 A1 * | 5/2002 | Wasynczuk et al. | | 703/22 |
| 2004/0044513 A1 * | 3/2004 | Kitahara | | 703/17 |
| 2006/0059473 A1 * | 3/2006 | Moler | | 717/149 |
| 2006/0129371 A1 * | 6/2006 | Orofino et al. | | 703/22 |
| 2006/0139587 A1 * | 6/2006 | Rossing et al. | | 355/53 |
| 2006/0294505 A1 * | 12/2006 | Englehart | | 717/131 |
| 2007/0074184 A1 * | 3/2007 | Raghavan et al. | | 717/138 |
| 2007/0261019 A1 * | 11/2007 | Raghavan et al. | | 717/105 |
| 2008/0040703 A1 * | 2/2008 | Englehart | | 717/104 |
| 2008/0059621 A1 * | 3/2008 | Raghavan et al. | | 709/223 |

OTHER PUBLICATIONS

The Mathworks User's Guide: "Stateflow and Stateflow Coder", Version 5, 2002.*
Errington, Lindsay. "Forges: Formal Synthesis of Generators for Embedded Systems", 2005.*
"StateChart Diagram", Mar. 2000.*
Poser, Adrian. "Extension of KIEL by Stateflow Charts", Dec. 2005.*

* cited by examiner

Primary Examiner — Shambhavi Patel
(74) Attorney, Agent, or Firm — Harrity & Harrity, LLP

(57) ABSTRACT

A system generates a state diagram model in a graphical modeling system, where the state diagram model includes at least one state. A condition statement is associated with the at least one state, and defines a condition upon which one or more actions associated with the at least one state are executed.

22 Claims, 9 Drawing Sheets

FIG. 6

CONDITIONALLY EXECUTED STATES

BACKGROUND

Technical computing environments present a user, such as a scientist or engineer, with an environment that enables efficient analysis and generation of technical applications. In some technical computing environments, for example, users may perform advanced analyses, visualize data, and develop algorithms. Ideally, a technical computing environment enables a technical researcher or designer to efficiently and quickly perform tasks such as research, product development, software and system development, etc.

Existing technical computing environments may be implemented as or run in conjunction with a graphically-based environment. For example, in one existing graphically-based technical computing environment, models may be built by connecting graphical blocks, where each block may represent an object associated with functionality and/or data. Blocks may be hierarchical in the sense that each block itself may be implemented as one or more blocks. A user may, for instance, view the model at a high level, and select blocks to drill down into the model to see increasing levels of model detail.

In addition to block diagram-based modeling environments, technical computing environments may include state diagramming environments that provide design tools for modeling and simulating event or mode driven systems and subsystems. Such state diagramming environments may be used to represent finite state machines that include states and transitions between states.

A state diagramming environment may receive inputs from a block diagram-based modeling environment. The state diagramming environment may perform state-based processing using the received inputs and may make outputs available to the block diagram-based modeling environment. Unfortunately, conventional state diagramming environments do not adequately support the conditional execution of states and their actions.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 illustrates an exemplary graphical user interface for configuring a condition statement provided in the state diagram model of FIG. 5A and FIG. 5B;

DETAILED DESCRIPTION

Figure 1:
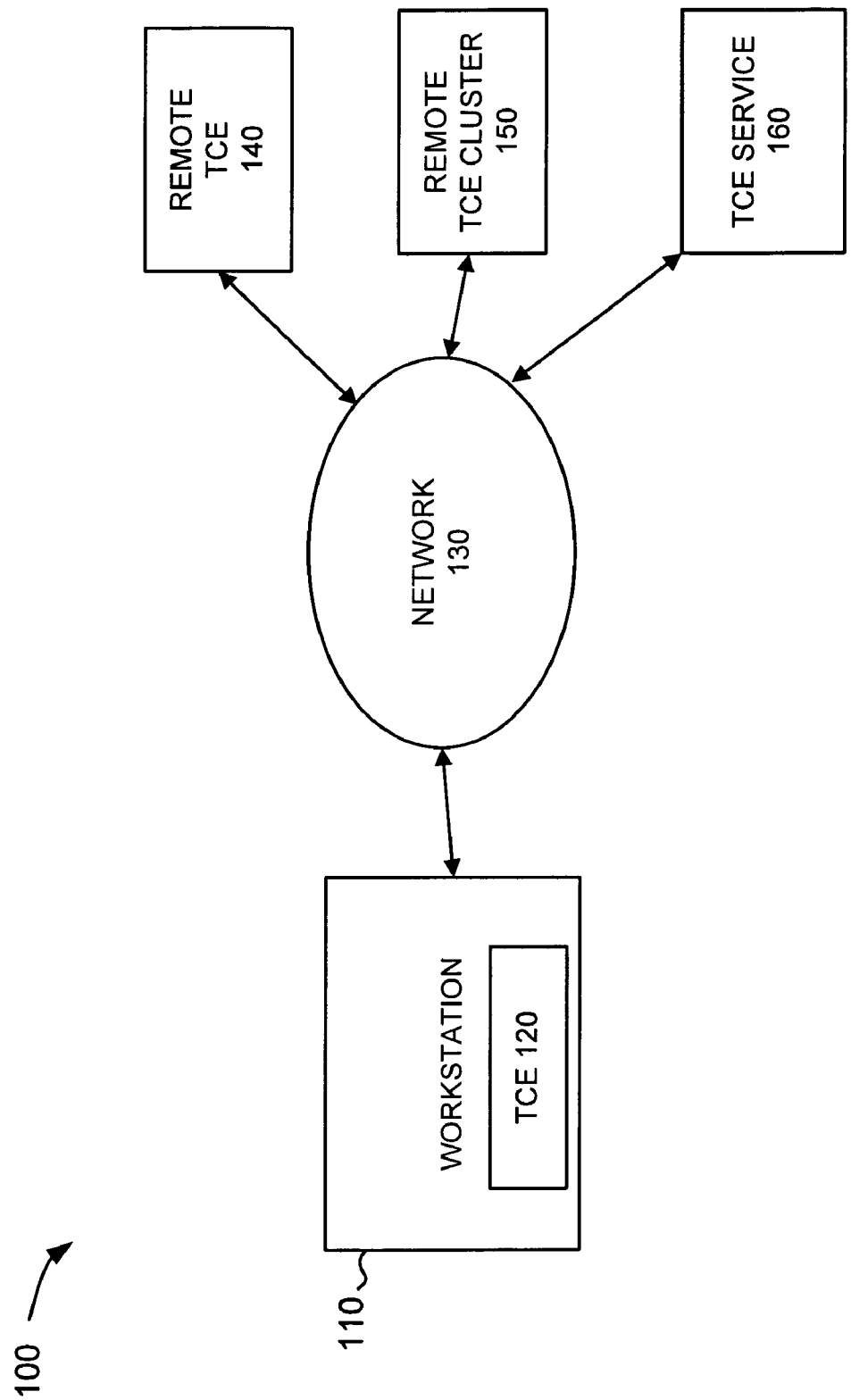
FIG. 1 is an exemplary diagram of a system in which concepts described herein may be implemented.

The following detailed description refers to the accompanying drawings. The same reference numbers in different drawings may identify the same or similar elements. Also, the following detailed description does not limit the invention.

Overview

Implementations described herein relate to a technical computing environment in which users may construct and execute event, mode, or state driven models or diagrams. In the manner described below, state diagram models may include conditionally executed states to provide for efficient bypassing of state action execution associated with a state.

Definitions

A "technical computing environment," as the term is used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a technical computing environment may include a dynamically-typed programming language (e.g., the M language) that can be used to express problems and/or solutions in mathematical notations. For example, a technical computing environment may use an array as a basic element, where the array may not require dimensioning. In addition, a technical computing environment may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A technical computing environment may further provide mathematical functions and/or graphical tools or blocks (e.g., for creating plots, surfaces, images, volumetric representations, etc.). In one implementation, a technical computing environment may provide these functions and/or tools using toolboxes (e.g., toolboxes for signal processing, image processing, data plotting, parallel processing, etc.). In another implementation, a technical computing environment may provide these functions as block sets. In still another implementation, a technical computing environment may provide these functions in another way, such as via a library, etc.

A technical computing environment may be implemented as a text-based environment (e.g., MATLAB®; Octave; Python; Comsol Script; MATRIXx from National Instruments; Matheinatica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; Lab View® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Exemplary System Description

FIG. 1 is an exemplary diagram of a system 100 in which concepts described herein may be implemented. The system may include a personal computer or workstation 110. Workstation 110 may execute a technical computing environment (TCE) 120 that presents a user with an interface that enables efficient analysis and generation of technical applications. For example, the TCE may provide a numerical and/or symbolic computing environment that allows for matrix manipulation, plotting of functions and data, implementation of algorithms, creation of user interfaces, and/or interfacing with programs in other languages.

Workstation 110 may operate as a single detached computing device. Alternatively, workstation 110 may be connected to a network 130, such as a local area network (LAN) or wide area network (WAN) such as the Internet. When workstation 110 is connected to a network, TCE 120 may be run by multiple networked computing devices or by one or more remote computing devices. In such an implementation, the TCE may be executed in a distributed manner, such as by executing on multiple computing devices simultaneously. Additionally, in some implementations, the TCE may be executed over a network 130 in a client-server relationship. For example, workstation 110 may act as a client that communicates with, using a web browser, a server that stores and potentially executes the TCE program.

For example, as shown in FIG. 1, system 100 may include a remote TCE 140 (e.g., a remotely located computing device running a TCE), a remote TCE cluster 150, and/or a TCE service 160. Remote TCE cluster 150 may include multiple computing devices that run TCEs that execute in a distributed or parallel manner. TCE service 160 may include a server computing device that provides a TCE as a remote service. For instance, a TCE may be provided as a web service. The web service may provide access to one or more programs (e.g., TCE) provided by TCE service 160. A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., workstation 110) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one example, a customer may receive the web service on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of resources used by the customer, etc.

Figure 2:
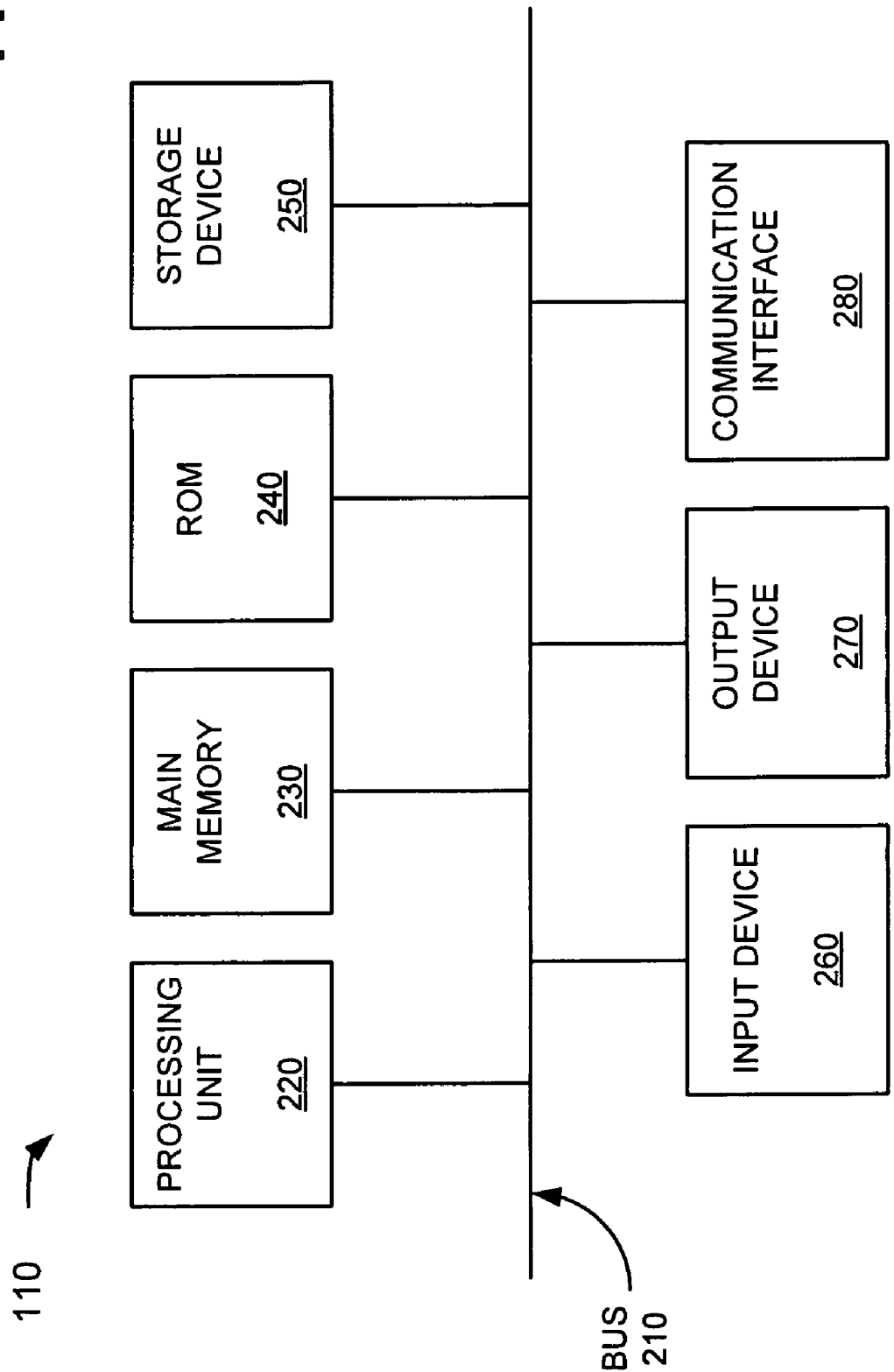
FIG. 2 is a diagram of an exemplary device corresponding to the workstation of FIG. 1.

FIG. 2 is a diagram of an exemplary device corresponding to workstation 110, although remote TCE 140, remote TCE cluster 150, and a TCE server executing TCE service 160 may be similarly configured. As illustrated, workstation 110 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 100.

Processing unit 220 may include a processor, microprocessor, or other types of processing logic that may interpret and execute instructions. Processing unit 220 may include general purpose processing devices and/or other types of processing devices, such as hut not limited to, reduced instruction set processors, field programmable gate arrays (FPGAs), a FPGA that may be configured through a hardware description language (HDL), application specific integrated circuits (ASICs), an ASIC that may be configured through a hardware description language (HDL), etc. Processing unit 220 may also include processing devices that use a single core and/or that use multiple cores.

Main memory 230 may include a random access memory (RAM) or another type of dynamic storage device (such as, DRAM, SRAM, EDO RAM, etc.) that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to workstation 110, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables workstation 110 to communicate with other devices and/or systems. For example, communication interface 280 may include mechanisms for communicating with another device or system via a network.

As will be described in detail below, workstation 110 may perform certain operations described herein in response to processing unit 220 executing software instructions contained in a computer-readable medium, such as main memory 230. A computer-readable medium may be defined as a physical or logical memory device and/or carrier wave. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

The computer-readable medium may particularly include a technical computing environment. The TCE may include any of the features defined above with respect to the term "technical computing environment." For example, in one implementation, the technical computing environment may include MATLAB® software that provides a variety of mathematical functions and/or graphical tools.

Although FIG. 2 shows exemplary components of workstation 110, in other implementations, workstation 110 may contain fewer, different, or additional components than depicted in FIG. 2. In still other implementations, one or more components of workstation 110 may perform one or more tasks described as being performed by one or more other components of workstation 100.

Exemplary Technical Computing Environment

Figure 3:
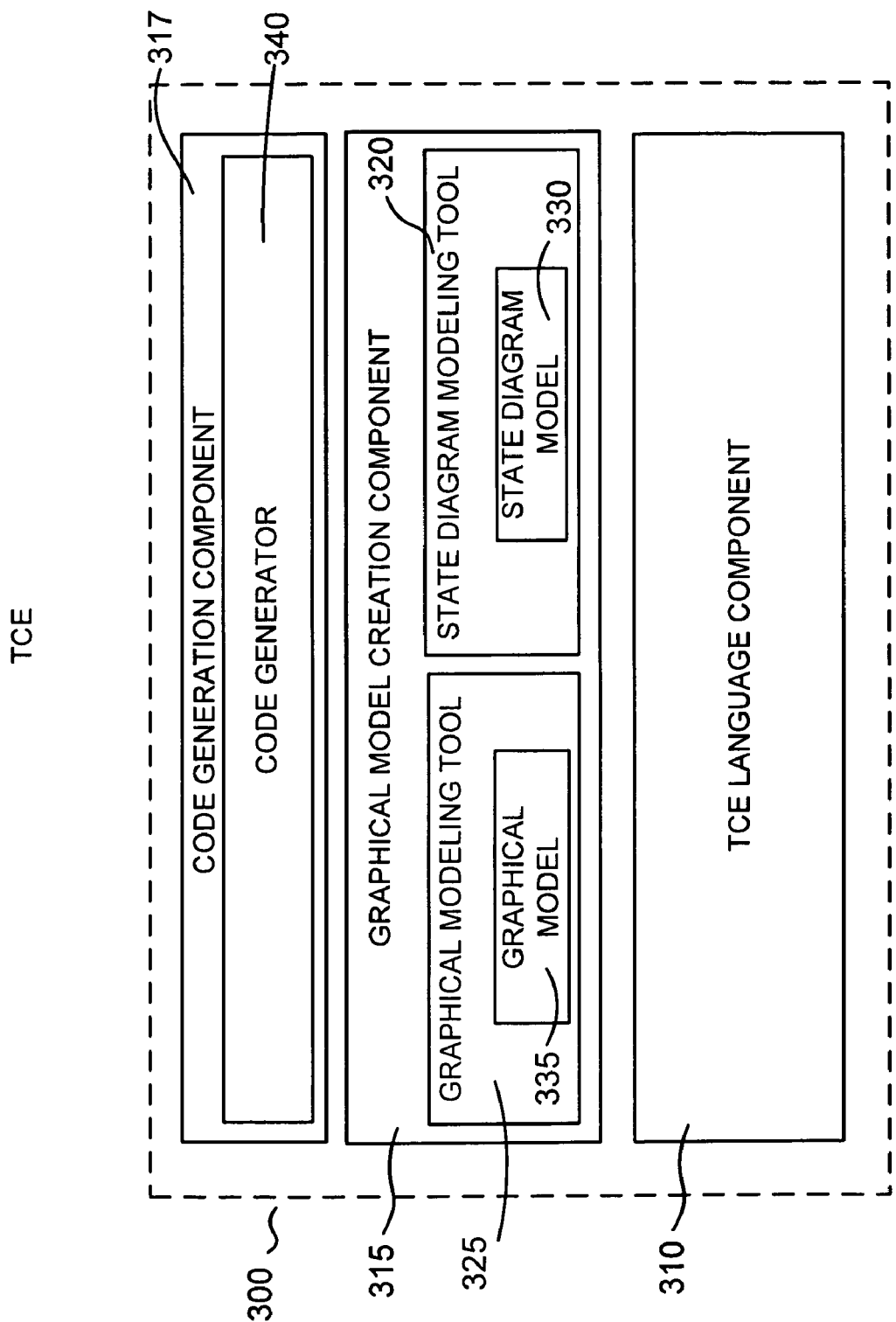
FIG. 3 is a diagram illustrating functional components of a technical computing environment (TCE)

FIG. 3 is a diagram illustrating exemplary functional components of a technical computing environment (TCE) 300. As mentioned, TCE 300 may include a program stored on a computer-readable medium, such as main memory 230 or ROM 240 in workstation 110. In other implementations, TCE 300 may be associated with another device separate from workstation 110, and may accessed by workstation 110 via communication interface 280 and a network. In yet other implementations, all or part of TCE 300 may be implemented in hardware.

TCE 300 may include a TCE language component 310, a graphical model creation component 315, and a code generation component 317. TCE language component 310 may generally function to implement a technical computing language. TCE language component 310 may, for example, provide an interface that integrates computation, visualization, and programming in a relatively easy-to-use environment where problems and solutions can be expressed in mathematical notation familiar to technical users.

Graphical model creation component 315 may include software for modeling, simulating, and/or analyzing dynamic systems. Graphical model creation component 315 may, for instance, support linear and nonlinear systems, models in continuous time, discrete time, or a hybrid of the two. Systems modeled with graphical model creation component 315 may be constructed using a graphical interface that allows the user to arrange blocks that represent functionality and/or data. Graphical model creation component 315 may additionally allow users to execute or run the created model and to view and analyze results of the model.

In general, graphical model creation component 315 may be used to graphically generate designs (i.e., models) that simulate the behavior of the design. The models may be used to facilitate communication, peer-review, and iterative refinement with visual representations that simplify understanding. Graphical model creation component 315 may include specialized blocks that can define error or fault conditions and that can be used to identify design flaws.

As shown in FIG. 3, graphical model creation component 315 may include a state diagram modeling tool 320 and a graphical modeling tool 325. State diagram modeling tool 320 may provide an environment for the design, development, testing, simulation, and/or execution of a state diagram model 330. Graphical modeling tool 325 may provide an environment for the design, development, testing, simulation, and/or execution of a graphical model 335, such as a block diagram model. Graphical modeling tool 325 may also incorporate and/or reference state diagram model 330 via graphical model 335. State diagram modeling tool 320 may communicate with graphical modeling tool 325 via any suitable type and form of interface.

State diagram modeling tool 320 may provide a design and development environment for creating any type and/or form of state diagram model 330, which may also be referred to as a state machine diagram model, a state diagram, a state chart, or a chart. In one exemplary implementation, and by way of example, state diagram modeling tool 320 may include Stateflow® software by The MathWorks, Inc. of Natick, Mass. In the exemplary embodiment of Stateflow® software, state diagram models may be referred to as Stateflow charts. Stateflow® software may integrate with graphical modeling tool 325, such as Simulink® software by The MathWorks, Inc. of Natick, Mass., to model, simulate, and/or analyze systems. In one embodiment, Stateflow® software may provide for the design and development of deterministic, supervisory control systems in a graphical environment. State diagram modeling tool 320 may provide for state machine representation, flow diagram notations, and/or state-transition diagrams all in the same state diagram model.

In one exemplary implementation, state diagram model 330 may include a graphical representation of a state machine, such as either a finite state machine or a non-deterministic state machine, where states and transitions between states form the building blocks of a system. A state machine may include a representation of an event or mode driven system where the system makes a transition from one state to another state provided any conditions associated with the transition are met. A state may be a mode of behavior that can be either active or inactive based on inputs, outputs, transitions, and/or conditions. A transition may link one state to another state and may have a condition, such as any logic, computation, algorithm, and/or executable instruction, used to determine if and when a transition between states may occur.

In one implementation consistent with aspects described herein, state diagram model 330 may include a truth table, graphical or otherwise, used to represent relationships between inputs, outputs, states, transitions, and/or conditions of a finite state machine. Although generally discussed herein as graphical state diagram model 330, any type of graphical state model may be used and that any type of state machine, such as a finite, non-deterministic, and/or a virtual state machine may be used in practicing the present invention. Additionally, state diagram modeling tool 320 and state diagram model 330 may use any type and/or form of notation for state machine representation, such as any notation known by those ordinarily skilled in the art, or any notation suitable for practicing the operations of the present invention.

State diagram modeling tool 320 may provide elements such as states, junctions, and functions, such as graphical functions of Simulink® software and/or Stateflow® software, that may be placed and arranged graphically in a window, design area or otherwise collectively in a state diagram model. States and junctions may be connected together in the state diagram model 330 to form flows and transitions for an implementation of a state machine.

State diagram modeling tool 320 may provide for parallelism in that two or more orthogonal states may be active at a same time. Additionally, state diagram modeling tool 320 may provide a mechanism for specifying transitions and/or conditions based on historical information related to execution of a state diagram model. Additionally, state diagram modeling tool 320 may use any type and/or form of graphical element to visually represent elements, such as for state machine representation, in state machine diagram model 330.

Furthermore, state diagram modeling tool 320 may provide for organizing, incorporating, and/or referring to sub-charts, hierarchically or otherwise, into state diagram model 330. For example, a first state diagram model representing a portion of an overall state machine design may be incorporated into or referenced by a top level state diagram model. Each state diagram model may be organized hierarchically into any number and/or levels of state diagram models to represent a finite state machine.

Additionally, state diagram modeling tool 320 may allow the representation of parallel states. For example, two or more states within the same hierarchy level may be active at the same time. In one implementation, state diagram modeling tool 320 may process states and events in a top-down processing manner. That is, state diagram modeling tool may process states and events beginning at the top of a state diagram's hierarchy and working its way down the hierarchy. In this manner, a state may be processed if it is active. For a given state to be active, its superstate (parent state) may be active as well.

The execution of state diagram model 330 may be driven by events that occur outside or inside of the state diagram model. For example, an event occurring in a graphical model 330 in which state diagram model 330 is embedded or referenced, may trigger execution of state diagram model 330. The occurrence of the event may cause the status of the states in the state diagram model 330 to be evaluated and may cause a transition to take place from one state to another. Specifically, an event may be broadcast to trigger a transition to occur. Additionally, the broadcast of an event may trigger an action to be executed. An action may include a function call, a broadcast event, a variable assignment, etc. Furthermore, the action may be executed as part of a transition from one state to another, or based on a status of a state. A transition can have either a condition action or a transition action. A condition action may be executed as soon as the condition is evaluated to be true but before the transition takes place. A transition action may be executed after the transition takes place.

Although state diagram modeling tool 320 is generally discussed in view of Stateflow® software, various forms and types of state diagram modeling tools may be used in practicing the operations of the present invention as described herein. In some embodiments, state diagram modeling tool 320 may comprise any type and/or form of a Petri net modeling and simulation tool. For example, state diagram modeling tool 320 may comprise any of the Petri modeling and simulation libraries or tools manufactured by Dynasim AB of Lund, Sweden. Corresponding state diagram models may comprise a visual formalism or graphical model representing a Petri net model or system.

A Petri net may include a graphical and mathematical modeling tool that provides a mathematical expression of discrete distributed systems and may be expressed in terms of places, transitions, and/or arcs that connect them. Petri nets may be used to describe and model systems that may be characterized as being concurrent, asynchronous, distributed, parallel, nondeterministic, and/or stochastic. Additionally, tokens or tickets may be used in Petri nets to simulate the activities of systems (e.g., dynamic and/or concurrent activities of systems). Accordingly, state diagram model 330 may include any type and/or form of constructs and elements representing a Petri net model, such as a place, a transition, an arc, a token, and/or a ticket.

In some embodiments, state diagram modeling tool 320 may include any type and/or form of event modeling and simulation tool, such as any discrete, continuous or hybrid event simulation system. For example, state diagram modeling tool 320 may include any of the event modeling and simulation tools manufactured by Imagine That, Inc. of San Jose, Calif., or Simul8 Corporation of Boston, Mass. Accordingly, state diagram model 330 may include a visual formalism or graphical model representing a continuous, discrete, or event modeling system. State diagram model 330 may represent system behavior that can be expressed in terms of what a system does in correspondence to an event or a certain number of event types, and may use model constructs or elements representing queues and/or servers. For example, a queue element may represent a queue of events, and a server element may represent an event server that processes events from the queue.

Additionally, in some embodiments, state diagram modeling tool 320 may be able to execute the state diagram model. For example, in the exemplary embodiment of Stateflow® software, state diagram modeling tool 320 may include a graphical execution and debugging environment that provides a user with control of the simulation execution of a corresponding state diagram model, and access to debug related tasks, such as setting breakpoints, etc. Additionally, state diagram modeling tool 320 may display information about the state machine or model 330, such as active and inactive states during execution or other information as requested or desired by the user.

As described above, in some embodiments, state diagram modeling tool 320 may be included in, integrated with, or otherwise be associated with a graphical modeling tool 325. In an exemplary embodiment, graphical modeling tool 325 may include the Simulink® graphical modeling environment from the MathWorks, Inc. of Natick, Mass. In graphical modeling tool 325, configurable and customizable functional blocks may be used to create block diagram models (such as graphical model 335) that may represent a design, or algorithm, for a control system, a signal processing system, a communication system, any other time-varying or dynamic system or any computational hardware device. In other embodiments, state diagram modeling tool 320 may be separate from graphical modeling tool 325 but otherwise interfaced or in communication with graphical modeling tool 325.

In one implementation, graphical modeling tool 325 may include any type and/or form of graphical model 335. Graphical modeling tool 325 may provide any type of tools, libraries, and/or configuration mechanisms to graphically create and/or edit graphical model 335. In an exemplary embodiment, graphical model 335 may include a block diagram model provided by the Simulink® environment of The MathWorks, Inc. In this example, the block diagram model may include a series of different type of blocks arranged in a desired manner and connected via connection lines to represent signal values traversing the blocks. Graphical model 335 may include any type of element to form a graphical or non-graphical model, such as connectors, blocks, or any other graphical or non-graphical form and representation of functionality supported by graphical modeling tool 325.

In one embodiment, graphical model 335 may incorporate, reference, or otherwise use a state diagram model created by or available within state diagram modeling tool 320. In an exemplary embodiment, Stateflow® software may be integrated and used with Simulink® software to provide an environment combining state diagram modeling of Stateflow® software with the graphical modeling of Simulink® software. In this embodiment, graphical model 335 may include any elements provided by graphical modeling tool 325, such as any elements of a block diagram model known by those ordinarily skilled in the art, and may also include state diagram model 330, or any portion thereof, that may be provided by state diagram modeling tool 320. For example, graphical model 335 may include a block diagram model having blocks connected as inputs and/or outputs of a state diagram model 330.

In one embodiment consistent with aspects described herein, graphical modeling tool 325 may facilitate simulation or execution of graphical model 335. For example, in the exemplary embodiment of the Simulink® software, graphical modeling tool 325 may include an environment that provides for the simulation and debugging of graphical model 335. Additionally, in other embodiments, graphical modeling tool 325 may generate computer-readable code including or designating executable instructions representing a graphical model to compile and build for executing on a target hardware platform and/or operating system. As such, graphical model 335 and/or state diagram model 330 may be processed into an executable form to simulate, run, or otherwise execute the design, functionality, and/or operations represented by graphical model 335 available within graphical modeling tool 325 and/or state diagram model 330 available within state diagram modeling tool 320. An executable form of graphical model 335 and/or state diagram model 330 may be any type and/or form of representation of a graphical model and/or a state diagram model that may be simulated, run or executed, and may include any graphical and/or textual forms, interpreted languages or scripts, programming languages, and/or any combination thereof. In some embodiments, the executable form of the graphical model and/or state diagram model may include any type of interpreted language, such as MATLAB® software. In other embodiments, the executable form of the graphical model and/or state diagram model may include any type of executable instructions, such as scripts, libraries, or compiled executables.

In one implementation consistent with aspects described herein, state diagram modeling tool 320 and graphical modeling tool 325 and any portion thereof may include an application, module, service, computer program, software component, library, or any other type and/or form of executable instruction which is designed to and capable of executing the functionality of the present invention as described herein. Additionally, state diagram modeling tool 320 and graphical modeling tool 325 may be configured to and capable of running any of the modules, libraries or software components of the MATLAB® (and/or Simulink® product families. As such, technical computing environment 300 may include all or a portion of the software components of MATLAB® software and/or Simulink® software installed on the workstation 110, or alternatively, accessible from another computing device on a network.

Code generation component 317 may include a code generator 340, such as the automatic code generator of Real-Time Workshop® from The MathWorks, Inc. of Natick, Mass. In one implementation, code generator 340 may generate source code from a graphical model 335 and/or state diagram model 330 to translate the functionality of graphical model 335 and/or state diagram model 330 into a program that may be designed to run on any processor, operating system, or otherwise customized to run on a specific target hardware platform.

In one implementation, code generator 340 may be capable of taking the state diagram model 330 and generating corresponding executable code by translating a high level representation of the state diagram model 330 into low level code for execution. By way of an example, Stateflow® software may use textual action language to describe states, actions, and transitions in a state diagram model. The textual action language statements in each Stateflow® object (states and transitions) may be parsed and translated to Abstract Syntax Trees (ASTs). It should be noted that there exist many other structures and intermediate representations (IRs) that can be used to describe states and transitions. The generated ASTs may be attached to their corresponding Stateflow® object. The semantics of the state diagram model may be analyzed and an IR of the state diagram model may be generated using Code Generation Intermediate Representation (CGIR). CGIR may include basic objects, such as, types, constants, variables, and functions, to represent elements of a state diagram models built in Stateflow® software. States and various types of functions in the state diagram model machine may be translated into CGIR functions. Transitions and junctions may yield control-flow graphs (CFGs) that form the bodies of the functions. CFGs may show how functions call each other in order to achieve a specific processing and execution of a state diagram models CFGs may be constructed using the CGIR functions to capture the high-level notions of a state diagram model, such as, for example, activating and deactivating a state.

Analysis and optimizations may be applied to the CGIR representation of the finite state machine model to transform the COIR representation into a lower-level representation that is convertible to a desired low level target language that can be compiled by a general purpose compiler, such as a C/C++ compiler, to generate executables that can numerically reproduce the simulation scenarios described in the original state diagram model. The target language may be C/C++, HDL, JAVA programming language, PLC languages such as Structured Text (as defined in IEC1131-3), Ada, etc. The process of transforming the CGIR representation to a lower-level representation that is convertible to a desired low level target language may be referred to as "lowering". There may be many stages of lowering processes in the transformation of the CGIR representation to a lower-level representation. The same lowering process may be employed more than once. The purpose of these lowering processes may be to transform the CGIR representation to a state that is most suitable to the backend of the code generation process. Optimizations may be employed in the code generation process to improve the efficiency and the effectiveness of the generated code as well as the code generation process itself. As way of an example, a vector may be used in a finite state machine model if the target language is C, then one of the lowering processes may transform calculations related to the vector to a for loop.

For example, given an expression $y = x1 + x2;$ where all the variables in the expression represent vectors, the expression can be translated into a "for" loop such as the following:

for $(i=0; i<n; i++)$ $\{y[i]=x1[i]+x2[i];\}$

If the CGIR representation has been transformed into a lower-level representation, a backend utility of CGIR may be used to generate executable code in the target language.

A staged evaluation of transitions may allow the code to be generated where it needs to be in a sequential set of instructions. In the case of preemption semantics, references may be required in the generated code to jump to the code fragment that needs to be executed, and hence less efficient code may be generated using preemption semantics as done in related applications of finite state machine.

State diagram modeling tool 320, graphical modeling tool 325, code generation component 317, and any portion thereof, can comprise an application, module, service, computer program, software component, library, or any other type and/or form of executable instruction which is designed to and capable of executing the functionality of the present invention as described herein.

Conditionally Executed States

As described briefly above, state diagram modeling tool 320 may be configured to enable hierarchical and parallel relationships between various states and substates in a state diagram model 330. In one implementation, state diagram modeling tool 320 may be further configured to support states or actions that are conditionally executed, such that execution of the state and any substate included in or subsequently reference by that state may be conditional upon the occurrence of a designated condition or number of conditions. Such conditionally executable states may be responsive to external events, such as temporary or transient error conditions, etc. that may trigger or result in a stoppage of state actions performed subsequent to the condition. Alternatively, by enabling conditionally executed states, suitable triggering events may be effectively modeled as input signals rather than discrete events, thereby facilitating efficient translation to computer code, hardware code (e.g., HDL), during code generation.

Figure 4A:
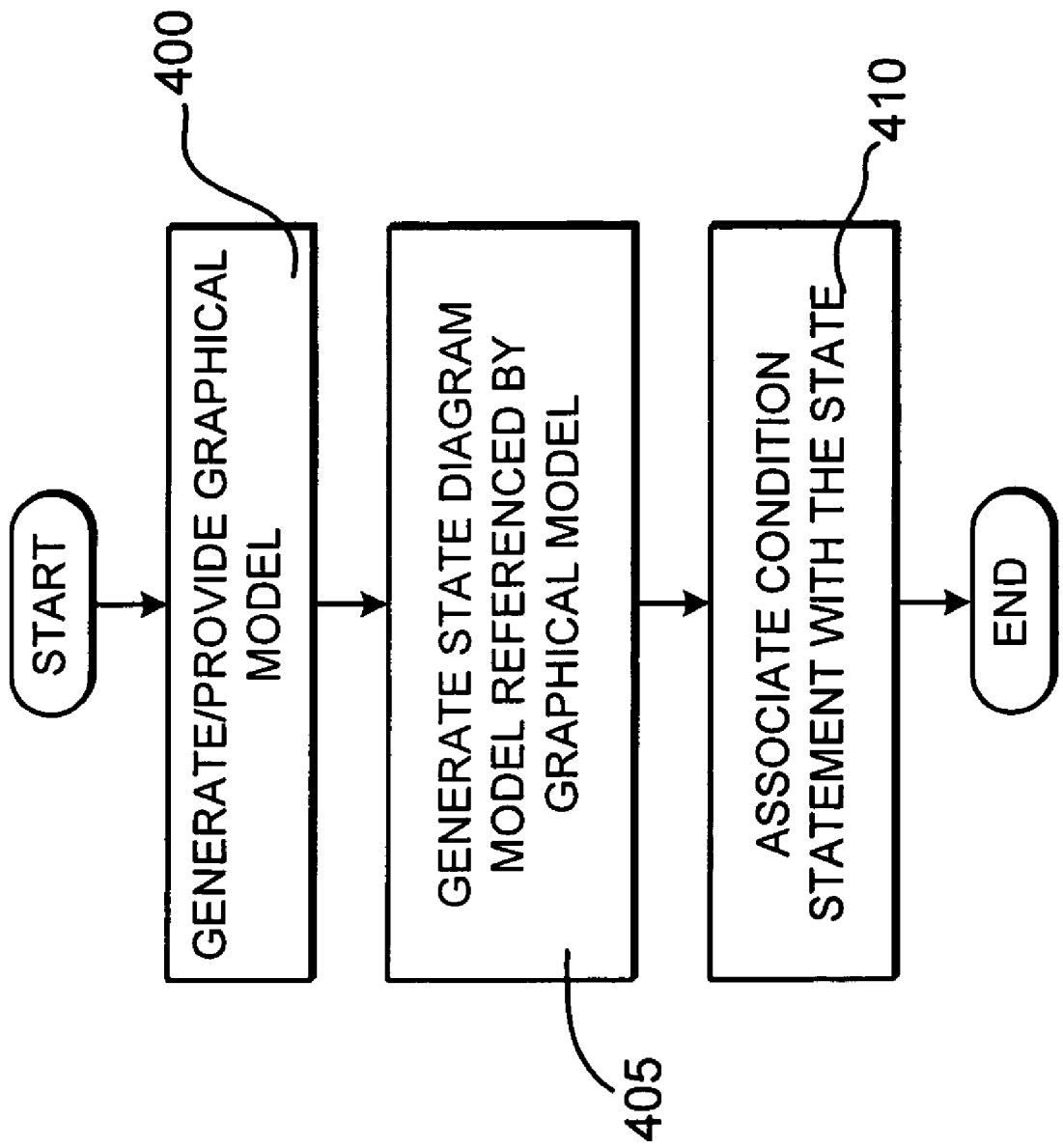
FIG. 4A is a flow diagram illustrating exemplary processing for facilitating recognition and handling of conditionally executed states provided within the state diagram model of FIG. 3.

FIG. 4A is a flow diagram illustrating exemplary processing for facilitating recognition and handling of conditionally executed states within a state diagram model, such as state diagram model 330. Processing may begin upon generation or provision of a graphical model within a graphical modeling tool (block 400). A state diagram model having at least one state may be created and referenced by the graphical model (block 405). As described above, graphical model 335 and state diagram model 330 may be formed within technical computing environment 300 and may include any suitable collection of graphical and non-graphical elements, blocks, signals, functions, operations, actions, etc.

A condition statement may be associated with the at least one state (block 410). Association of the condition statement may be made during or subsequent to creation of the state diagram model. Consistent with aspects described herein, the condition statement may designate a condition to be met prior to execution of any actions or transitions associated with the at least one state with which it may be associated. A failure to meet the condition may result in the cessation or stubbing out of state actions beginning in the state in which the condition has been set. The condition statement may equally apply to any substates or transitions included within the conditionally executed state 410. Such conditioned actions may include during actions, exit actions, or any transitions between states and substates.

Condition statements may include a variety of statement types, such as function calls, Boolean expressions, etc. Further, condition statements may be associated with states in any suitable manner. In one implementation, the condition statement may be textually defined within the body of a graphical state element provided within state diagram model 330. Alternatively, the condition statements may be configured via an additional configuration interface. Details regarding such an exemplary configuration interface are set forth below with respect to FIG. 6.

4B is a flow diagram illustrating exemplary processing performed by graphical modeling tool 325 upon activation of a state using the model generated in FIG. 4A. Processing may begin upon calling state diagram model 330 from graphical model 335 (block 415). Next, a state in a state diagram model may be activated (block 420). It should be understood that activating a state may include following a default transition upon awakening of the state diagram model 330, or transitioning between states upon normal processing of the state diagram model. Upon state activation, any entry actions associated with the activated state may be executed (block 425). Entry actions may include those actions performed upon initial state activation and may not performed again until the state is re-activated at a later time.

It may then be determined whether the activated state includes a condition statement (block 430). As described above, a condition statement may designate a condition to be met prior to execution of any actions or transitions associated with the state with which it is associated. If it is determined that the activated state does not include a condition statement (block 430-NO), any during actions associated with the state may be executed (block 435). It may then be determined whether a transition condition associated with the state has been met (block 440). If no transition condition is met (block 440-NO), the process returns to block 435 for continued execution of any during actions. However, if a transition condition is met, (block 440-YES), any exit actions associated with the state may be executed (block 445) and the state may transition to the next state (block 450). The process may then return to block 420 for processing based on the next activated state.

Returning to block 430, if it is determined that the activated state includes a condition statement (block 430-YES), it may be determined whether the condition statement evaluates to true (block 455). In other words, it may be determined whether the condition necessary for state actions to be executed has occurred. If the condition statement evaluates to true (block 455-YES), processing may continue to block 435 described above. However, if the condition statement does not evaluate to true (block 455-NO), all state action may be suspended until the condition statement evaluates to true (block 460). The condition statement may be periodically return to block 455 for continued evaluation of the condition statement regarding whether state action may be resumed. If the condition statement still evaluates to true, processing again returns to block 460 for the next evaluation cycle. However, if subsequent evaluation of the condition statement evaluates to true (block 455-YES), state action may continue to block 435, as described above.

Figure 5B:
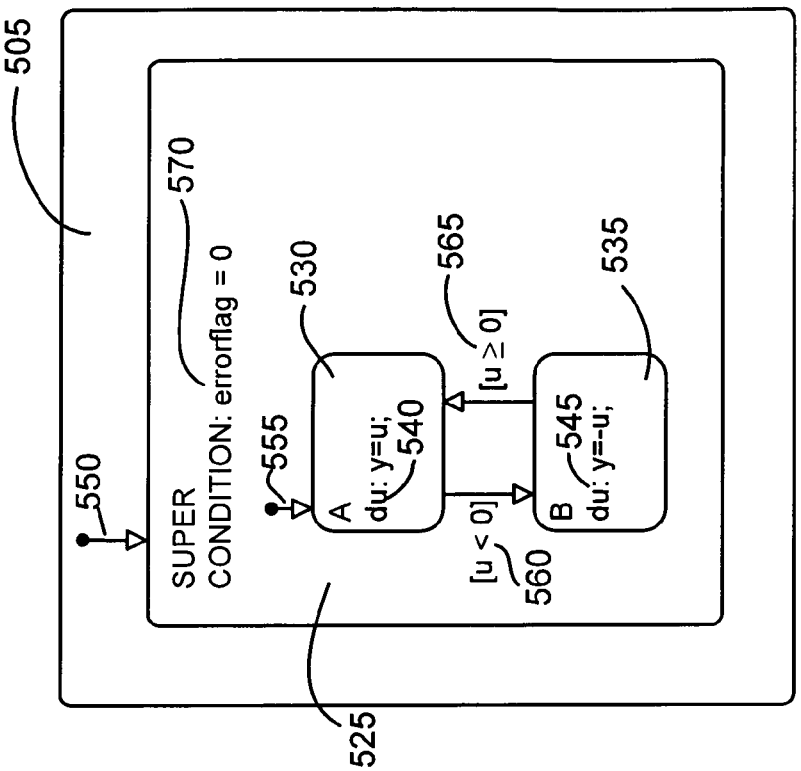
FIG. 5B is a block diagram illustrating details of the state diagram graphical element of FIG. 5A.
Figure 5A:
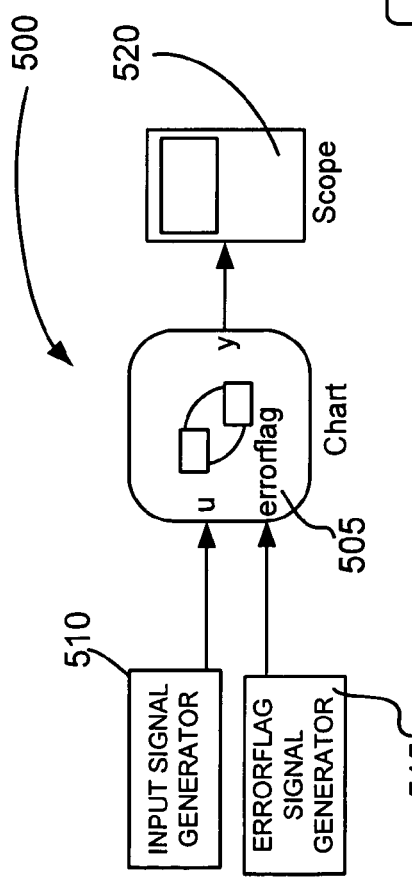
FIG. 5A is a block diagram illustrating an exemplary graphical model generated by or viewable in the graphical modeling tool of FIG. 3.

FIG. 5A is a block diagram illustrating an exemplary graphical model 500 generated by or viewable in graphical modeling tool 325 that includes a state diagram graphical element 505 representing one or more states and/or substates. Input signal generator 510 may generate a signal (u) as an input to state diagram element 505. Errorflag signal generator 515 may generate an errorflag signal (errorflag) as a second input to state diagram element 505. In this exemplary implementation, the output of errorflag signal generator 515 may correspond to an error condition initiated in another portion of graphical model 500 that is not shown. Scope element 520 may receive a signal (y) as an output from state diagram graphical element 505.

FIG. 5B is a block diagram illustrating details of state diagram graphical element 505 that may be configurable using, for example, state diagram modeling tool 320. Consistent with aspects described herein, state diagram graphical element 405 may include a parent state 525 (designated "Super" in FIG. 5B), and a pair of substates 530 (designated "A" in FIG. 5B) and 535 (designated "B" in FIG. 5B). Substate 530 may include a during action 540 and substate 535 may include a during action 545.

During actions may be performed while their respective states remain active and may include atomic during actions and internal during actions. Atomic during actions (such as actions 540 and 545) may be actions that rely on or call only data input to or generated by the state with which they are associated. That is, atomic actions may not access global data outside of their parent state diagram element (e.g., element 505). Internal during actions, conversely, may rely on global data and may call or trigger other states or state diagrams.

State 525 may include a default transition 550. A default transition may represent a transition taken when a state first becomes active. In situations in which one of two parallel states may be activated in response to an event or signal, the default transition may indicate which of the states should be initially activated. State 530 may include a default transition 555. State 530 may then transition to state 535 upon occurrence of transition condition 560 (u<0). Similarly, state 535 may transition to state 530 upon occurrence of transition condition 565 (u≧0).

Consistent with aspects described above, state 525 may include a condition statement 570 designating a condition that must be met prior to execution of any actions or transitions associated with state 525 or any of its substates 530 and 535. Such actions may include during actions, exit actions, or any transitions between states.

In operation, upon being awakened by input signals (u) and (errorflag), state diagram element 505 may perform any entry action associated with parent state 525. In this case, no entry actions have been provided. Following execution of any entry actions, state diagram element 505 may evaluate any condition statements provided in the activated state (e.g., state 325). In this exemplary embodiment, the errorflag signal may be a binary signal (e.g., either a 1 or a 0) representative of an error condition. If the condition statement evaluates to true (e.g., that errorflag=0), execution of any subsequent state actions, transitions, etc. may be performed. However, if the condition statement evaluates false (e.g., that errorflag=1), then execution of all state action associated with state 325 and its substates may be stopped.

At every execution time interval, the condition may be re-evaluated and, if it again evaluates true, state actions may continue where they had been previously aborted. In this manner, a currently executing state or substate may be maintained during a temporary or transient error condition without requiring restart of the entire system.

Figure 6:
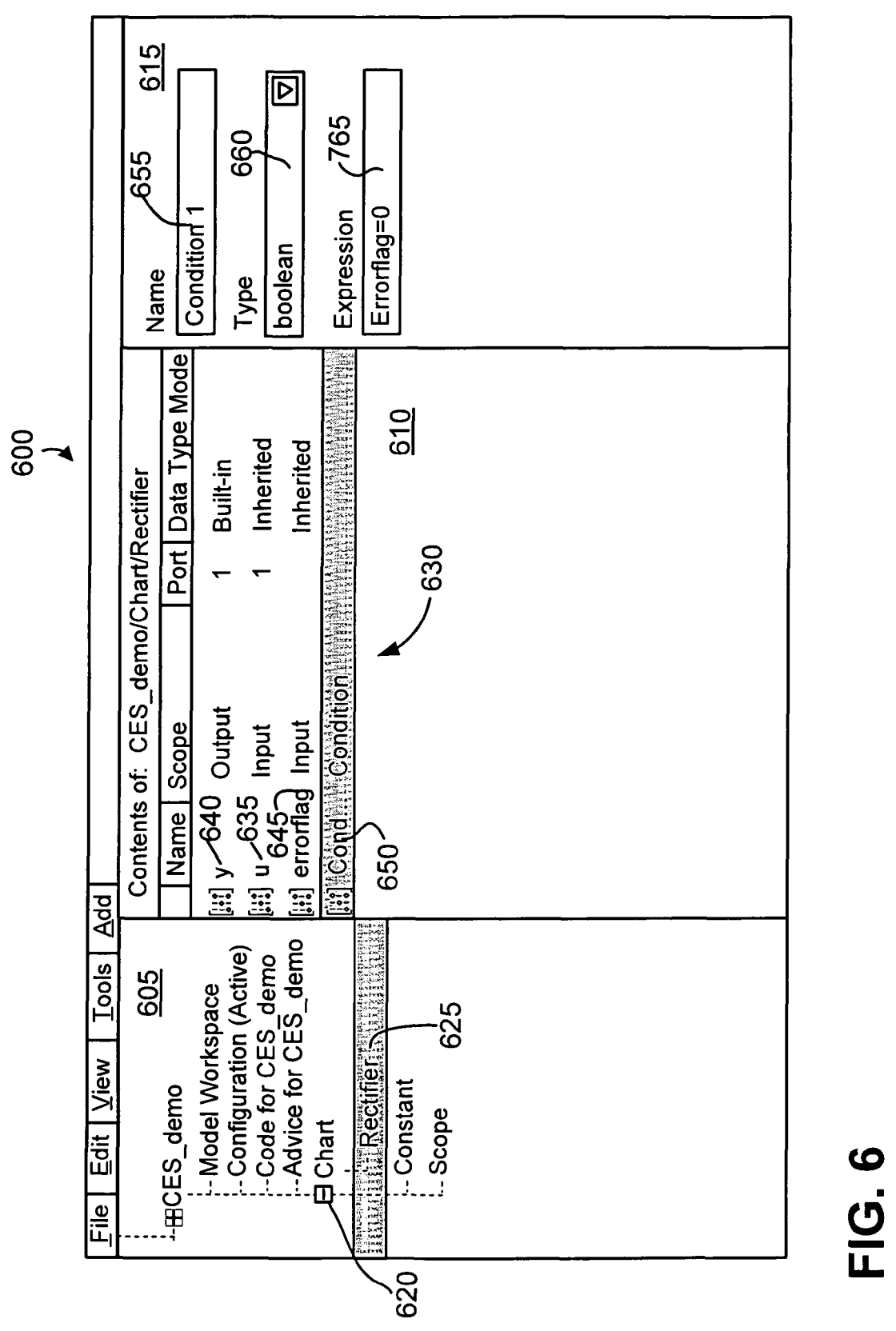

As described above, in one implementation, the values of any condition statements may be received directly within state diagram element 505. In another exemplary implementation, non-graphical elements of state diagram graphical element 505, such as textual expressions including condition statements may be configured or modified using a hierarchical graphical interface. FIG. 6 illustrates an exemplary graphical user interface 600 for configuring condition statement 570 which may be represented graphically within state diagram element 505 in FIG. 5B. Interface 600 may include a model hierarchy pane 605, a contents pane 610, and a dialog pane 615. Model hierarchy pane 605 may include a selectable listing of elements associated with a graphical model, such as model 500. Available elements may depend in part upon the graphical and non-graphical components of graphical model 500 and may include selections corresponding to a model workspace, configuration settings, code corresponding to model 500, and blocks or elements included within graphical model 500. Contents pane 610 may dynamically illustrate child objects associated with an element selected in model hierarchy pane 605, and may be used to add, view, and/or configure the available objects. Similarly, dialog pane 615 may dynamically depict or present information relating to an element or object selected in hierarchy pane 605 or contents pane 610.

In the embodiment illustrated in FIG. 6, model hierarchy pane 605 for model "CES_demo" may be configured to include a listing for a chart 620 that includes a state object 625 entitled "Rectifier". The Rectifier state object 625 may correspond to state diagram graphical element 505 in FIGS. 5A and 5B. Selection of Rectifier state object 625 in model hierarchy pane 605 (e.g., by selection with any suitable input device) may result in display of a number of child objects 630 relating to Rectifier state object 625. In general, states included within a state diagram model, such as state diagram graphical model 505, may include a variety of elements, such as truth table functions, graphical functions, embedded MATLAB® functions, data, events, targets, transitions, etc. In the embodiment of FIG. 6, child objects 630 may be configured to include data objects relating to the input (u) 635, output (y) 640, input (errorflag) 645, and condition statement 650.

Consistent with aspects described herein, selection of condition statement 650 within contents pane 610 may result in presentation of content statement specific dialog pane 615. Dialog pane 615 may include fields for receiving input or selection of various parameters and options associated with condition statement 650, such as a name field 655, a type field 660, and an expression field 665.

Figure 7B:
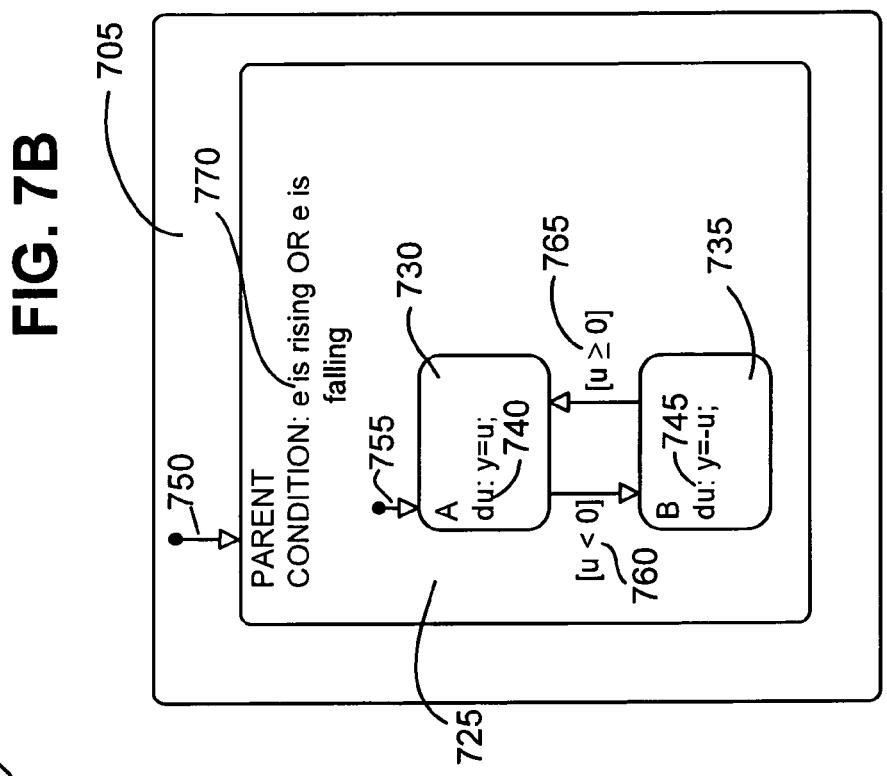
FIG. 7B is a block diagram illustrating details of another state diagram graphical element of FIG. 7A.
Figure 7A:
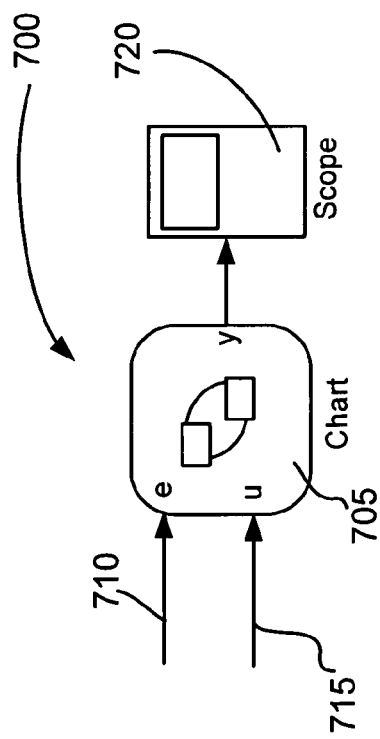
FIG. 7A is a block diagram illustrating another exemplary graphical model provided in the graphical modeling tool of FIG. 3.

FIG. 7A is a block diagram illustrating an exemplary graphical model 700, generated by or viewable in graphical modeling tool 325, that includes an event-driven state diagram graphical element 705 representing one or more states and/or substates. As described briefly above, in order to provide for more efficient hardware level code generation, it may be necessary to transition event-based or even-driven state diagram models into signal or data-driven state diagram models. In this implementation, rather than receiving an event, state diagram element 705 may instead receive an event signal (e) 710 that may subsequently form the basis of a state condition statement. In addition to event signal (e) 710, state diagram element 705 may also receive an input signal (u) 715. In this exemplary implementation, event signal (e) 710 may be analyzed upon state activation to determine whether state actions should be performed. Scope element 720 may receive a signal (y) as an output from state diagram graphical element 505.

FIG. 7B is a block diagram similar to the block diagram of FIG. 5B illustrating details of state diagram graphical element 705 that may be configurable using, for example, state diagram modeling tool 320. Consistent with exemplary embodiments, state diagram graphical element 705 may include a parent state 725 (designated "Super" in FIG. 7B), and a pair of substates 730 (designated "A" in FIG. 7B) and 735 (designated "B" in FIG. 7B). Substate 730 may include a during action 740 and substate 735 may include a during action 745.

States 725 and 730 may include default transitions 750 and 755, respectively. State 730 may include a transition 760 to state 735 upon occurrence of a first transition condition (u<0). Similarly, state 735 may include a transition 765 to state 730 upon occurrence of a second transition condition (u≧0).

Consistent with aspects described above, state 725 may include a condition statement 770 designating a condition that must be met prior to execution of any actions or transitions associated with state 725 or any of its substates 730 and. In the present embodiment, condition statement 770 may examine the input event signal (e) and determine whether this signal is experiencing a falling or rising edge. In operation, upon being awakened by input signals (u) and (e), state diagram element 505 may evaluate the condition statement (e is rising OR e is falling). In this exemplary embodiment, if e is rising or falling, it may be considered an edge and state action may be performed, otherwise state action may be prevented or stopped. If the condition statement evaluates to true (e.g., that e is either rising or falling), execution of any subsequent state actions, transitions, etc. may be performed. However, if the condition statement evaluates false (e.g., that e is not rising or falling), execution of all state action associated with state 325 and its substates may be stopped.

As with state diagram model element 505 in FIG. 5B, at every execution time interval, the condition may be re-evaluated and, if it again evaluates true, state actions may be continued where they had been previously aborted. In this manner, a currently executing state or substate may be maintained during a temporary or transient error condition without requiring restart of the entire system.

Figure 8:
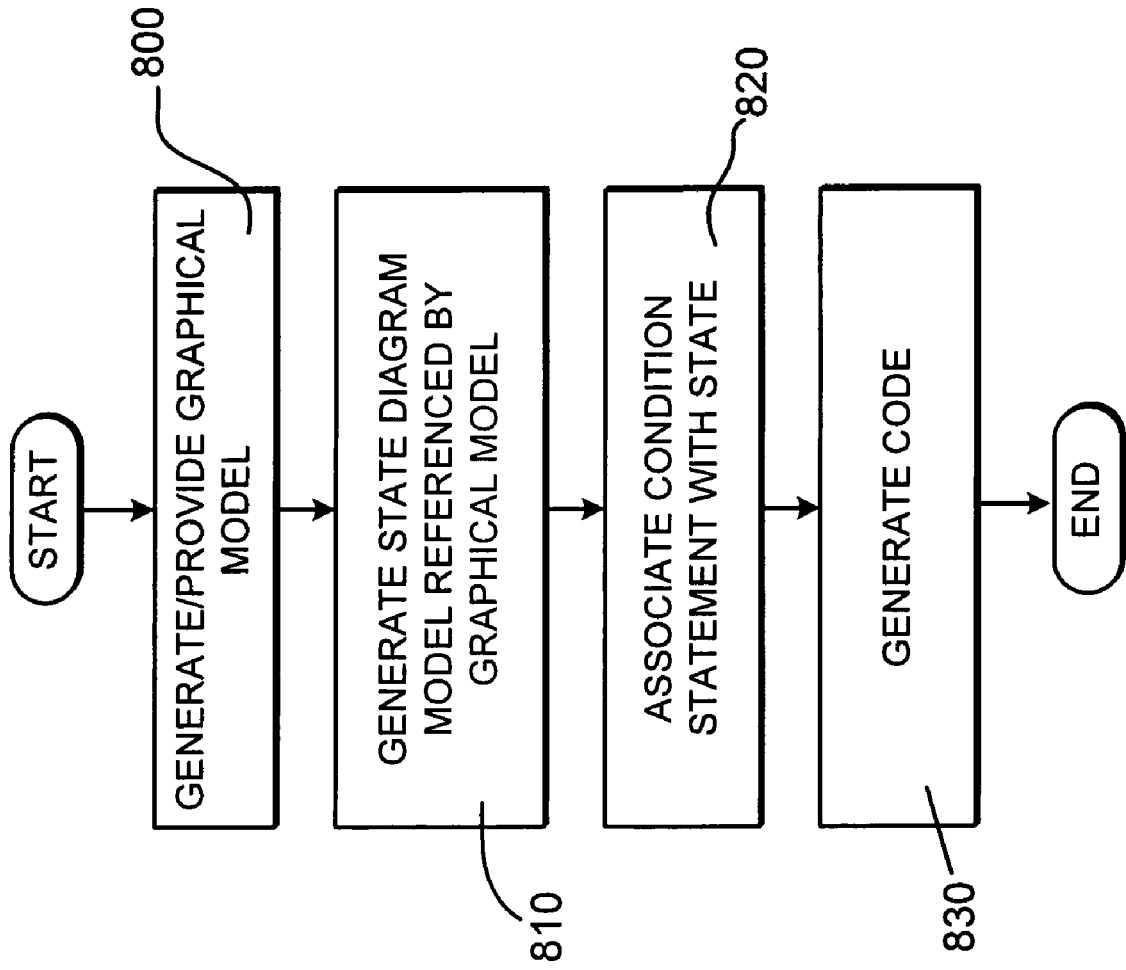
FIG. 8 is a flow diagram illustrating exemplary processing for facilitating recognition and handling of conditionally executed states within the state diagram model of FIG. 3.

FIG. 8 is a flow diagram illustrating additional exemplary processing for facilitating recognition and handling of conditionally executed states within a state diagram model, such as state diagram model 330. Processing may begin upon generation or provision of a graphical model within a graphical modeling tool (block 800). A state diagram model having a least one state may be created and referenced by the graphical model (block 810). As described above, graphical model 335 and state diagram model 330 may be formed within TCE 300 and may include any suitable collection of graphical and non-graphical elements, blocks, signals, functions, operations, actions, etc.

A condition statement may be associated with the at least one state (block 820). As described above, condition statements may designate one or more conditions that must be met prior to initial or continued execution of any actions or transitions associated with the at least one state with which it is associated. A failure to meet the condition results in the cessation or stubbing out of state actions beginning in the state in which the condition has been set. The condition statement equally applies to any substates or transitions included within the conditionally executed state. Such conditioned actions may include during actions, exit actions, or any transitions between states and substates.

Following provision of the state diagram model in the graphical modeling tool, computer-readable code, such as source code, object code, a compiled executable, a library, etc., for forming an executable representation corresponding to the state diagram model may be generated (block 830). As described above, code generation may be used to generate a HDL or a register transfer language (RTL) representation of the state diagram model. The generated code may be stored in multiple files. For example, part of the generated code may be stored in a header file, while another part of generated code may be stored in a source file.

In one implementation, code generation may be performed by code generator tool 340, such as Real-Time Workshop® from The MathWorks, Inc. of Natick, Mass., or any software tool that may be capable of generating executable code, instructions, etc., in a programming language such as Java, Javascript, Python, C, C++, an assembly language, etc.; a hardware description language such as Verilog, VHDL, etc.; RTL; etc.

During the code generation process, code generator tool 340 may generate one or more IRs prior to generating code from the state diagram model. For example, code generator 340 may generate an IR and may subsequently generate code from the IR. Additionally, code generator 340 may generate code for the execution of the state diagram model that is provided by the state diagram modeling tool 320 or graphical modeling tool 325. In one embodiment, generated code may be designed to run on any processor, microprocessor, dual-core processor, multi-core processor, a cluster of processors, digital signal processor (DSP), system on chip (SOC), reconfigurable signal conditioning hardware, operating system, computational hardware device, component of a computational hardware device, etc. In one embodiment, generated code may include embedded code targeted to run on any type of embedded system. For example, generated code may be implemented as firmware in an electronic system that uses a microprocessor or a microcontroller. Additionally, generated code can be customized to run on a specific target hardware platform. For example, generated code may include fixed-point code to run a fixed-point processor or generated code may emulate fixed-point behavior on a floating-point processor.

Consistent with aspects described herein, an IR corresponding to conditionally executed states may include a structure modified from a structure included in an IR that does not correspond to conditionally executed states. More specifically, for conditionally executed states, during actions included within the IR may be constructed to include outer IF conditions that surround the entire content of the during action, including any transitions to substates or other hierarchically lower actions, functions, transitions, junctions, etc. In one example, an IR automatically generated using such a during action structure may be represented as:

```
During( )
{
    IF(call to Outer_Paths( ) causes a state transition) {
        Return;
    }
    IF(<boolean expression representing the condition on the state>) {
        Perform During Actions;
        IF(call to Inner_Paths( ) causes a state transition) {
            Return;
        }
        --- for states with XOR decomposition
        Call During( ) of active child
        --- for states with AND decomposition
        Call During( ) of each child state according to the
    execution order
    }
}
```

Because this IR construction may not use events or stack-based function calls, it may be readily translatable to HDL as well as C or other programming languages.

It should be noted that transitions or actions in a state diagram model may include event broadcasts. Event broadcasts in state diagram models may result in events being sent from one state to one or more additional states. In this manner, a currently active state not subject to a condition statement may send an event to an internal state or substate that is subject to a parent state's condition statement. Because the state receiving the event broadcast may be a conditionally executed state or may be a substate of a conditionally executed state, execution of any action corresponding to the receiving state may be checked against any condition statement associated with a parent state to the receiving state.

Providing a structure and mechanism for conditionally executing states in a state diagram mode, such as state diagram model 330, results in significantly more efficient execution and code generation. Moreover, temporary or transient event handling may be more efficiently handled, resulting in state diagram models and corresponding code having significantly fewer errors.

CONCLUSION

The structure and content of state diagram models described herein may provide for increased efficiency and enhanced code generation when modeling states configured to respond to conditions prior to performing state actions.

The foregoing description of implementations provides illustration and description, but is not intended to be exhaustive or to limit the invention to the precise form disclosed. Modifications and variations are possible in light of the above teachings or may be acquired from practice of the invention.

Figure 4B:
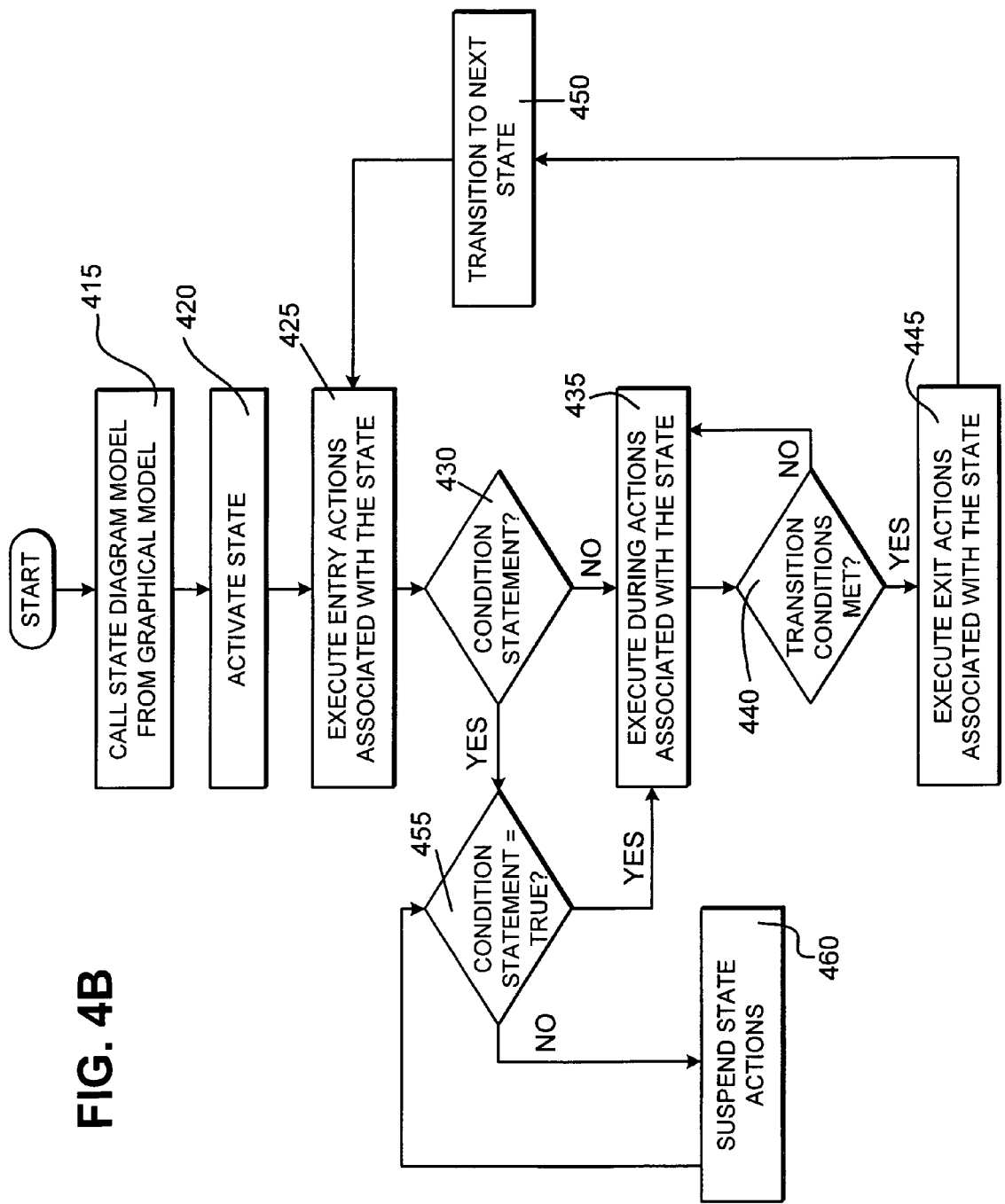
FIG. 4B is a flow diagram illustrating exemplary processing performed by the graphical modeling tool of FIG. 3 upon activation of a state using the model generated in FIG. 4A.

For example, while a series of acts has been described with regard to FIGS. 4A, 4B, and 8, the order of the acts may be modified in other implementations. Further, non-dependent acts may be performed in parallel.

Also, the term "user" has been used herein. The term "user" is intended to be broadly interpreted to include a workstation or a user of a workstation.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    generating a state diagram model in a modeling system,
        the state diagram model including at least one state, and
        generating the state diagram model being performed by a computing device;
    associating a condition statement with the at least one state,
        the condition statement not associated with a transition to the at least state and defining a condition upon which one or more actions associated with the at least one state may be executed, and
        associating the condition statement being performed by the computing device;
    activating the at least one state in the state diagram model,
        activating the at least one state being performed by the computing device;
    evaluating, at a first execution time interval and for the activated at least one state, the condition statement,
        evaluating the input signal at the first execution time interval being performed by the computing device;
    determining, for the first execution time interval, that the condition statement evaluates to true,
        determining that the condition statement evaluates to true being performed by the computing device;
    executing, for the first execution time interval, the one or more actions, based on determining that the condition statement evaluates to true,
        the at least one state remaining activated, in the state diagram model, following the executing of the one or more actions, and
        executing the one or more actions being performed by the computing device;
    evaluating, at a second execution time interval, the condition statement,
        the second execution time interval occurring:
            after the first execution time interval, and
            during the execution of the one or more actions,
        evaluating the condition statement at the second execution time interval being performed by the computing device;
    determining, for the second execution time interval, that the condition statement does not evaluate to true,
        determining that the condition statement does not evaluate to true for the second time interval being performed by the computing device;
    suspending, while the at least one state is still active and for the second execution time interval, an execution of the one or more actions based on determining that the condition statement does not evaluate to true for the second execution time interval,
        suspending the execution of the one or more actions being performed by the computing device;
    evaluating, at a third execution time interval, the condition statement,
        the third execution time interval occurring after the second execution time interval, and
        evaluating the condition statement at the third execution time interval being performed by the computing device;
    determining, for the third execution time interval, whether the condition statement evaluates to true,
        determining whether the condition statement evaluates to true for the third execution time interval being performed by the computing device;
    resuming, for the third execution time interval, the execution of the one or more actions when the condition statement evaluates to true for the third execution time interval; and
        resuming the execution of the one or more actions for the third execution time interval being performed by the computing device;
    continue suspending, for the third execution time interval and when the condition statement does not evaluate to true, execution of the one or more actions until the condition statement is determined to evaluate to true for a fourth execution time interval,
        the fourth execution time interval occurring after the third execution time interval, and
        continue suspending the execution of the one or more actions being performed by the computing device.

2. The method of claim 1, where the state diagram model is generated in a graphical modeling system,
    where the graphical modeling system includes one or more graphical elements corresponding to the at least one state, and
    where associating the condition statement with the at least one state further comprises:
        textually inserting the condition statement into at least one of the one or more graphical elements.

3. The method of claim 1, where associating the condition statement with the at least one state further comprises:
inserting the condition statement into a configuration interface,
the configuration interface being associated with the modeling system, and
the configuration interface corresponding to the at least one state.

4. The method of claim 1, where the condition statement comprises one of:
a function call, or
a Boolean expression.

5. The method of claim 1, where the one or more actions associated with the at least one state comprise one or more of:
during actions,
exit actions,
transitions,
function calls,
event broadcasts, or
junctions.

6. The method of claim 1, where the modeling system is executed across multiple distributed computing devices.

7. The method of claim 1, where the state diagram model comprises a hierarchically configured model, and
where the at least one state includes at least one substate, the substate including one or more substate actions.

8. The method of claim 7, where suspending the one or more actions for the second time interval includes:
suspending an execution of the one or more substate actions, based on determining that the condition statement does not evaluate to true for the second time interval.

9. The method of claim 7, further comprising:
receiving an event broadcast at the at least one substate; and
identifying the condition statement based on the event broadcast,
where the condition statement is evaluated further based on receiving the event broadcast.

10. The method of claim 1, further comprising:
generating code corresponding to the state diagram model.

11. The method of claim 1, where the modeling system is executed in a multi-core processing unit.

12. The method of claim 10, where the modeling system is executed across multiple distributed computing devices.

13. The method of claim 12, where the multiple distributed computing devices are connected via a network.

14. The method of claim 1, where the modeling system is executed as a service available to another computing device via a network.

15. A non-transitory computer-readable memory device that stores instructions, the instructions comprising:
one or more instructions, executable by at least one processor, to:
generate a state diagram model in a modeling system, the state diagram model including at least one state;
define a condition statement associated with the at least one state,
the condition statement not being associated with a transition to the at least state and defining the condition upon which one or more actions associated with the at least one state may be executed;
activate the at least one state in the state diagram model;
evaluate, at a first time interval and for the activated at least one state, the condition statement;
determine, for the first time interval, that the condition statement evaluates to true;
execute the one or more actions based on determining that the condition statement evaluates to true for the first time interval,
the at least one state remaining activated, in the state diagram model, following the one or more actions being executed;
evaluate, at a second time interval, the condition statement;
determine, for the second time interval, that the condition statement does not evaluate to true;
suspend an execution of the one or more actions, for the second time interval, based on determining that the condition statement does not evaluate to true for the second time interval,
the at least one state remaining active while suspending the execution of the one or more actions,
evaluate, at a third time interval, the condition statement,
the third time interval occurring after the second time interval;
determine, for the third time interval, whether the condition statement evaluates to true;
resume, for the third time interval, the execution of the one or more actions when the condition statement evaluates to true for the third time interval; and
continue to suspend, when the condition statement does not evaluate to true and for the third time interval, the execution of the one or more actions,
the execution continuing to be suspended until the condition statement evaluates to true for a fourth time interval, and
the fourth time interval occurring after the third time interval.

16. The non-transitory computer-readable memory device of claim 15, where the at least one state includes at least one substate that is associated with at least one substate action,
where the one or more instructions to suspend the execution of the one or more actions, for the second time interval, include:
one or more instructions to suspend, for the second time interval, an execution of the at least one substate action.

17. The non-transitory computer-readable memory device of claim 15, where the state diagram model comprises a hierarchical state diagram that executes in a top-down manner.

18. The non-transitory computer-readable memory device of claim 15, where the instructions further comprise:
one or more instructions to generate code corresponding to the state diagram model,
where the one or more instructions to generate the code include:
one or more instructions to model the condition upon which one or more actions associated with the at least one state may be executed as an input signal.

19. The non-transitory computer-readable memory device of claim 15, where the one or more instructions to activate the at least one state in the state diagram model include:
one or more instructions to receive an input signal at the state diagram model; and
one or more instructions to receive an event signal at the state diagram model,
where the condition statement is based on changes to the event signal.

20. A system, comprising:
at least one device to:
generate a state diagram model that includes at least one state, the at least one state including:
  at least one state action, and
  at least one condition statement not associated with a transition to the at least state,
  the at least one state defining conditions for executing the at least one state action, and
  the at least one state remaining active, in the state diagram model, following execution of the at least one state action;
activate the at least one state in the state diagram model;
evaluate, at a first time interval and for the activated at least one state, the at least one condition statement;
determine, for the first time interval, that the at least one condition statement evaluates to true;
execute the at least one state action based on determining that the condition statement evaluates to true for the first time interval,
  the at least one state remaining activated, in the state diagram model, following the at least one state being executed;
evaluate, at a second time interval, the at least one condition statement;
determine, for the second time interval, that the at least one condition statement does not evaluate to true;
suspend an execution of the at least one state action, for the second time interval, based on determining that the at least one condition statement does not evaluate to true for the second time interval,
  the at least one state remaining active while suspending the execution of the at least one state action,
evaluate, at a third time interval, the at least one condition statement,
  the third time interval occurring after the second time interval;
determine, for the third time interval, whether the at least one condition statement evaluates to true;
resume, for the third time interval, the execution of the at least one state action when the at least one condition statement evaluates to true for the third time interval; and
continue to suspend, when the at least one condition statement does not evaluate to true and for the third time interval, the execution of the at least one state action,
  the execution continuing to be suspended until the condition statement evaluates to true for a fourth time interval, and
  the fourth time interval occurring after the third time interval.

21. The system of claim 20, where the at least one condition statement corresponds to occurrences of an error condition.

22. A method, comprising:
calling a state diagram model by a modeling system,
  the state diagram model including:
    at least one state comprising a state action, and
    a condition statement that is not associated with a transition to the at least state and that designates a condition upon which the state action is executable, and
  calling the state diagram model being performed by a computing device;
determining, for a first time interval, that the condition is met based on evaluating the condition statement,
  determining that the condition is met for the first time interval being performed by the computing device;
executing, for the first time interval, the state action based on the condition being met,
  the at least one state remaining active, in the modeling system, following execution of the state action, and
  executing the state action for the first time interval being performed by the computing device;
determining, for a second time interval and during execution of the state action, that the condition is no longer being met,
  determining that the condition is no longer being met for the second time interval being performed by the computing device;
suspending, based on the condition no longer being met for the second time interval, the execution of the state action,
  suspending the execution of the state action for the second time interval being performed by the computing device;
determining, at a third time interval and during the suspension of the state action, whether the condition is again met,
  determining whether the condition is again met being performed by the computing device;
resuming, when the condition is again met, the execution of the state action for the third time interval,
  resuming the execution of the state action for the third time interval being performed by the computing device; and
continuing to suspend, when the condition statement is not again met and for the third time interval, the execution of the state action,
  the execution continuing to be suspended until the condition statement evaluates to true for a fourth time interval, and
  the fourth time interval occurring after the third time interval.

* * * * *